(12) United States Patent
Atsuta et al.

(10) Patent No.: US 8,541,861 B2
(45) Date of Patent: Sep. 24, 2013

(54) INFRARED DETECTION DEVICE

(75) Inventors: Masaki Atsuta, Kanagawa-ken (JP); Hideyuki Funaki, Tokyo (JP); Keita Sasaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/069,610

(22) Filed: Mar. 23, 2011

(65) Prior Publication Data

US 2012/0061791 A1 Mar. 15, 2012

(30) Foreign Application Priority Data

Sep. 13, 2010 (JP) ................................. 2010-204798

(51) Int. Cl.
*H01L 31/058* (2006.01)
(52) U.S. Cl.
USPC ................... 257/470; 257/420; 257/E29.347; 438/52
(58) Field of Classification Search
USPC .................... 257/470, E29.347, 420; 438/52
See application file for complete search history.

(56) References Cited

U.S. PATENT DOCUMENTS

2005/0052724 A1* 3/2005 Suzuki et al. ................. 359/305

FOREIGN PATENT DOCUMENTS

| JP | 2001-156277 | 6/2001 |
| JP | 2007-024842 | 2/2007 |

* cited by examiner

*Primary Examiner* — Eugene Lee
*Assistant Examiner* — Elias M Ullah
(74) *Attorney, Agent, or Firm* — Turocy & Watson, LLP

(57) ABSTRACT

According to one embodiment, an infrared detection device includes a detection element. The detection element includes a semiconductor substrate, a signal interconnect section, a detection cell and a support section. The semiconductor substrate is provided with a cavity on a surface of the semiconductor substrate. The signal interconnect section is provided in a region surrounding the cavity of the semiconductor substrate. The detection cell spaced from the semiconductor substrate above the cavity includes a thermoelectric conversion layer, and an absorption layer. The absorption layer is laminated with the thermoelectric conversion layer, and provided with a plurality of holes each having a shape whose upper portion is widened. The support section holds the detection cell above the cavity and connects the signal interconnect section and the detection cell.

13 Claims, 15 Drawing Sheets

INFRARED DETECTION DEVICE

CROSS-REFERENCE TO RELATED APPLICATIONS

This application is based upon and claims the benefit of priority from the prior Japanese Patent Application No. 2010-204798, filed on Sep. 13, 2010; the entire contents of which are incorporated herein by reference.

FIELD

Embodiments described herein relate generally to an infrared detection device.

BACKGROUND

An uncooled type (thermal type) infrared detection device is the device that absorbs and converts infrared rays into heat by an infrared absorbing layer, and that converts the heat into an electrical signal by a thermoelectric conversion device. In the uncooled type infrared detection device, a surface microstructure or a bulk microstructure forming technology is used in order to thermally isolate the infrared absorbing layer and the thermoelectric conversion device from an external system. A cooled type (quantum type) infrared detection device requires an expensive and large cooler, while the uncooled type infrared detection device has an advantage of being small and inexpensive.

Sensitivity per one pixel of this uncooled type infrared detection device is as follows. Given that incident infrared power per unit area is $I_{light}$, an infrared absorbance of a detection cell γ, an infrared absorption area per unit pixel AD, a thermal conductance from the detection cell to a semiconductor substrate Gth, and a thermoelectric conversion coefficient of a p-n junction dV/dT, an output signal $V_{signal}$ of a thermoelectric conversion section is expressed by Equation (1).

$$V_{signal} = (I_{light} AD\gamma/Gth)(dV/dT) \quad (1)$$

In addition, when using a thermal capacity Cth and the thermal conductance Gth of the detection cell, a response characteristic of the infrared detection device is expressed by Equation (2).

$$T = Cth/Gth \quad (2)$$

In Equation (2), T is a thermal time constant, and it denotes a time period until the output signal changes to be approximately 63% of a maximum value with respect to an incident signal, and provides an index of the response characteristic.

In order to improve the sensitivity of the infrared detection device, according to Equation (1), it is only necessary to increase the infrared absorption area AD, the infrared absorbance γ, and the thermoelectric conversion coefficient dV/dT of the p-n junction, and to reduce the thermal conductance Gth.

However, although the thermoelectric conversion coefficient dV/dT of the p-n junction is proportional to the number of diodes, increase in number of diodes leads to increase in driving power, causing increase of power consumption. In addition, since a dV/dT characteristic of a single diode is determined by bandgap energy of a semiconductor, significant increase thereof cannot be expected. When the thermal conductance Gth is reduced, sensitivity improves, but the thermal time constant drops, thus resulting in the reduced response characteristic. Increase of the infrared absorption area AD also increases a pixel pitch size by the increase, and the response characteristic is reduced due to increase in the thermal capacity. When the infrared absorbing layer is the single one, the infrared absorbance γ increases exponentially with respect to a thickness of the layer, and therefore, when a desired absorbance is tried to be obtained, thermal capacity increases accordingly, thus causing the reduced response characteristic. Namely, the sensitivity and the response characteristic are in a trade-off relationship. Hence, when priority is given to characteristic improvement of either one of the sensitivity and the response characteristic, the characteristic of the other one inevitably deteriorates.

DETAILED DESCRIPTION

In general, according to one embodiment, an infrared detection device includes a detection element. The detection element includes a semiconductor substrate, a signal interconnect section, a detection cell and a support section. The semiconductor substrate is provided with a cavity on a surface of the semiconductor substrate. The signal interconnect section is provided in a region surrounding the cavity of the semiconductor substrate. The detection cell spaced from the semiconductor substrate above the cavity includes a thermoelectric conversion layer, and an absorption layer. The absorption layer is laminated with the thermoelectric conversion layer, and provided with a plurality of holes each having a shape whose upper portion is widened. The support section holds the detection cell above the cavity and connects the signal interconnect section and the detection cell.

Various embodiments will be described hereinafter with reference to the accompanying drawings.

First Embodiment

Hereinafter, a first embodiment will be described using drawings. It is to be noted that the same or similar symbols are given to the same or similar portions in the following descriptions of the drawings.

Figure 1:
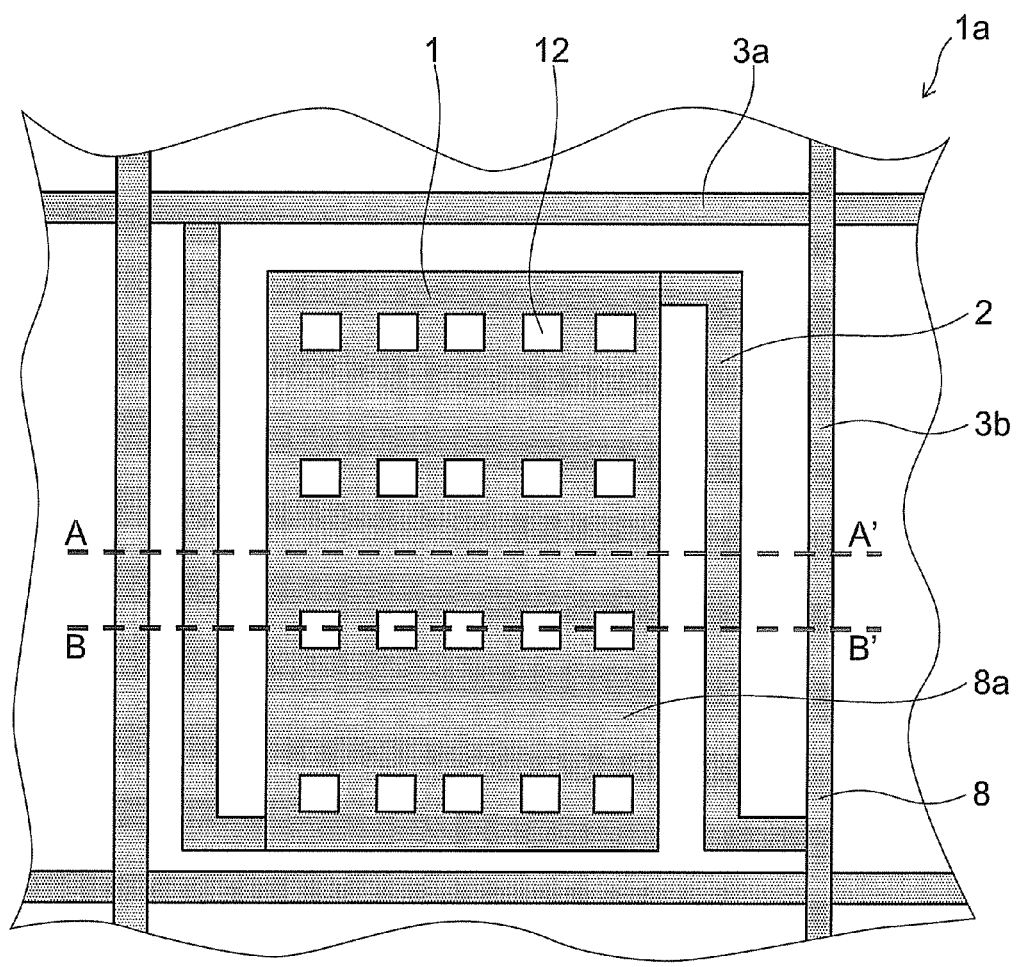
FIG. 1 is a plan view of an infrared detection device according to a first embodiment.
Figure 2:
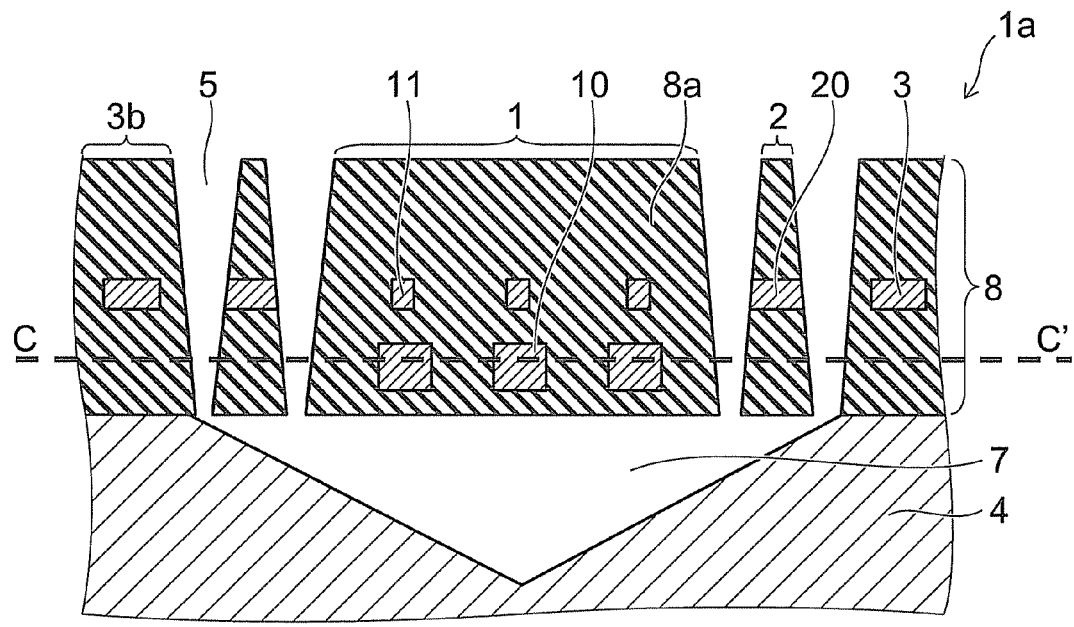
FIG. 2 is a sectional view taken along a line A-A' in FIG. 1.
Figure 3:
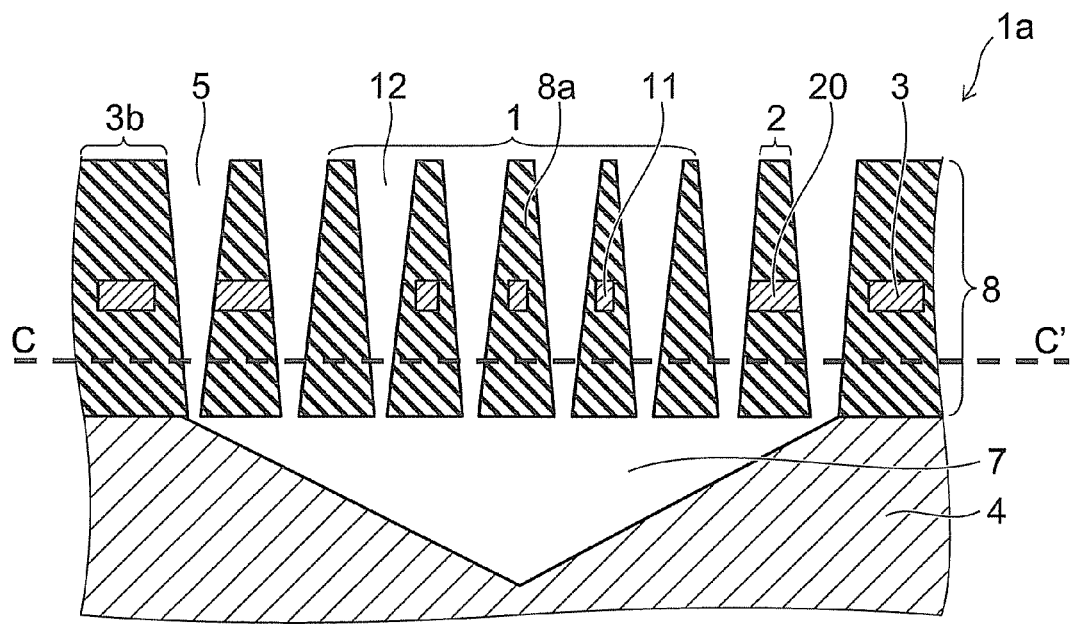
FIG. 3 is a sectional view taken along a line B-B' in FIG. 1.

FIG. 1 is a plan view of an infrared detection device according to a first embodiment. FIG. 2 is a sectional view taken along a line A-A' in FIG. 1. FIG. 3 is a sectional view taken along a line B-B' in FIG. 1.

The infrared detection device according to the first embodiment includes a detection element 1a as will be described hereinbelow. A plurality of detection elements 1a is provided, and is arranged in a matrix. The plurality of detection elements 1a serves as a detector array. Each of the plurality of detection elements 1a includes a detection cell 1. The detection cell 1 has an absorption layer 8a and a thermoelectric conversion layer 10. The absorption layer 8a is laminated together with the thermoelectric conversion layer 10. The absorption layer 8a absorbs and converts infrared rays into heat. The thermoelectric conversion layer 10 converts the heat into an electrical signal. The absorption layer 8a is laminated over the thermoelectric conversion layer 10. The absorption layer 8a has an upper portion than the thermoelectric conversion layer 10.

As shown in FIG. 1, the detection cell 1 is disposed in a region surrounded by a plurality of horizontal address lines 3a aligned in a horizontal direction at an approximately fixed interval, and by a plurality of vertical signal lines 3b aligned in a vertical direction at an approximately fixed interval. The detection cell 1 is connected to the horizontal address line 3a and the vertical signal line 3b through a pair of support sections 2. The pair of support sections 2 also have a function to hold the detection cell 1 in midair as will be described hereinbelow.

As shown in FIG. 1, one end of the support section 2 is connected to the horizontal address line 3a or the vertical signal line 3b. A signal interconnect section 3 is formed by the horizontal address line 3a or the vertical signal line 3b. The other end of the support section 2 is connected to the detection cell 1, and the detection cell 1 is supported by the support section 2 to float in midair. The detection cell 1 is provided with a plurality of detection cell through-holes 12 (holes). A plane shape of the plurality of detection cell through-holes 12 is, for example, a quadrangle. The plane shape of the plurality of detection cell through-holes 12 is, for example, a rectangle, and herein, the quadrangle (including the rectangle) also includes, for example, a shape whose corner is rounded. The plurality of detection cell through-holes 12 is, for example, regularly arranged. For example, a fixed space is provided along a predetermined axis between the adjacent plurality of detection cell through-holes 12.

Using FIGS. 2 and 3, will be described an example of an entire configuration of the infrared detection device according to the first embodiment.

As shown in FIG. 2, a cavity 7 is provided on a surface of a semiconductor substrate 4. In addition, the horizontal address lines 3a and the vertical signal lines 3b are provided in a region surrounding the cavity 7 of the semiconductor substrate 4. The horizontal address line 3a and the vertical signal line 3b include the signal interconnect section 3 and a protective insulating film 8 covering around the section, the film being based on an insulating material. In a region corresponding to the detection cell 1, the protective insulating film 8 serves as the absorption layer 8a. The absorption layer 8a absorbs infrared rays.

Hereinafter, the horizontal address line 3a and the vertical signal line 3b are appropriately simply referred to as signal lines in some cases. The vertical signal lines 3b are shown as the signal lines in FIGS. 2 and 3, but the signal lines correspond to the horizontal address lines 3a in a cross section vertical to the line A-A'.

The support section 2 is connected to the horizontal address line 3a or the vertical signal line 3b. The support section 2 is disposed inside the signal lines (at a cavity 7 side), and above the cavity 7 of the semiconductor substrate 4. The support section 2 includes a support interconnect section 20 and the protective insulating film 8 covering around the section, the film being based on the insulating material.

The detection cell 1 is connected to the support section 2. The detection cell 1 is supported above the cavity 7 of the semiconductor substrate 4. The detection cell 1 includes the thermoelectric conversion layer 10, detection cell interconnect section 11, and the absorption layer 8a. The absorption layer 8a covers around the thermoelectric conversion layer 10 and the detection cell interconnect section 11. The protective insulating film 8 based on the insulating material is used for the absorption layer 8a. The detection cell through-holes 12 are provided in the absorption layer 8a. The detection cell through-holes 12 are taper-processed in the absorption-layer 8a.

As described above, the infrared detection device according to the embodiment includes the detection element 1a. The detection element 1a includes the semiconductor substrate 4, the signal interconnect section 3, the detection cell 1, and the support section 2. The cavity 7 is provided on the surface of the semiconductor substrate 4. The signal interconnect section 3 is provided in a region surrounding the cavity 7 of the semiconductor substrate 4. The detection cell 1 is spaced apart from the semiconductor substrate 4 above the cavity 7. The detection element 1 includes the thermoelectric conversion layer 10 and the absorption layer 8a. The absorption layer 8a is laminated together with the thermoelectric conversion layer 10. The absorption layer 8a is provided with the plurality of detection cell through-holes 12 (holes). The plurality of detection cell through-holes 12 respectively has a shape whose upper portion is widened. The support section 2 is connected to the signal interconnect section 3. The support section 2 is spaced apart from the semiconductor substrate 4 above the cavity 7 in a region between the signal interconnect section 3 and the detection cell 1. The support section 2 holds the detection cell 1.

In the specification, the "holes" include both through-holes and non-through-holes.

In this example, the detection cell through-holes 12 penetrate the absorption layer 8a.

The thermoelectric conversion layer 10 and the detection cell interconnect section 11 are electrically conducted with each other, but this conduction portion is omitted in FIGS. 2 and 3. The protective insulating film 8 has a function as an infrared absorption section. The protective insulating film 8 is, for example, formed of an insulating material, such as silicon dioxide and silicon nitride, as a single layer or a multilayer structure. The protective insulating film 8 is simply shown in FIGS. 2 and 3. Namely, the absorption layer 8a contains, for example, the insulating material, such as silicon dioxide and silicon nitride. The absorption layer 8a has the single layer or the multilayer structure.

The whole device is reduced-pressure-packaged (vacuum-packaged). Namely, an atmosphere around the detection cell 1 and the support section 2, and an atmosphere in the cavity 7 are reduced in pressure (for example, they are in a vacuum state). The detection cell 1 separated from the semiconductor substrate 4 is placed in the vacuum, and thereby thermal insulation property of the detection cell 1 is improved to increase sensitivity.

The thermoelectric conversion layer 10 has a p-n junction. Change of a voltage or a current in a forward direction is read under a condition of a fixed current or voltage by utilizing temperature dependency of a forward characteristic of the p-n junction in the thermoelectric conversion layer 10.

Figure 4:
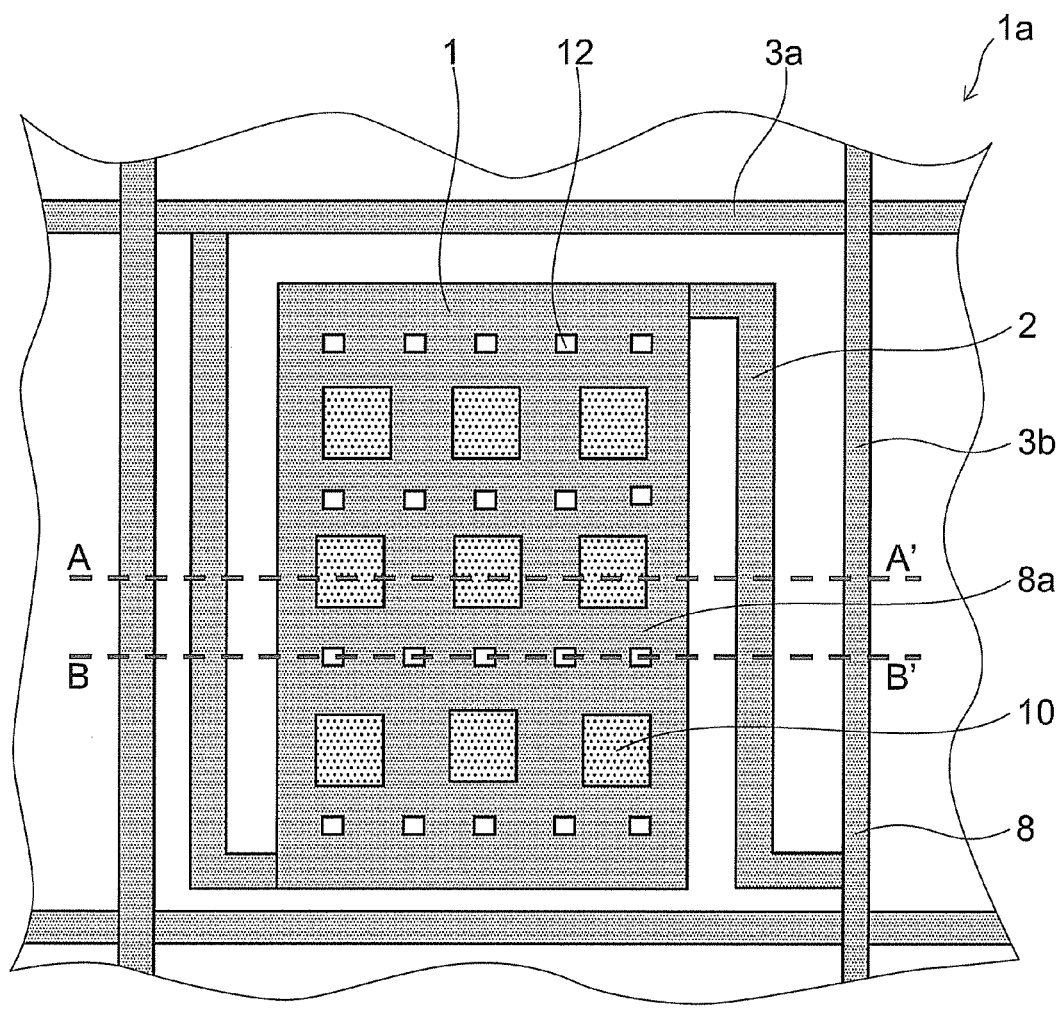
FIG. 4 is a plan view taken along a line C-C' in FIGS. 2 and 3.

In FIG. 4, a detailed configuration of the thermoelectric conversion layers 10 and the detection cell through-holes 12 of the detection cell 1 is shown. The detection cell through-holes 12 are provided in the protective insulating film 8 of peripheries of the thermoelectric conversion layers 10. FIG. 4 is a plan view taken along a line C-C' of the layer including the thermoelectric conversion layers 10 shown in FIGS. 2 and 3.

Will be described a procedure example of manufacturing processes of the infrared detection device according to the first embodiment. FIGS. 5 to 15 are sectional views showing the example of the manufacturing processes of the infrared detection device according to the first embodiment.

Figure 5:
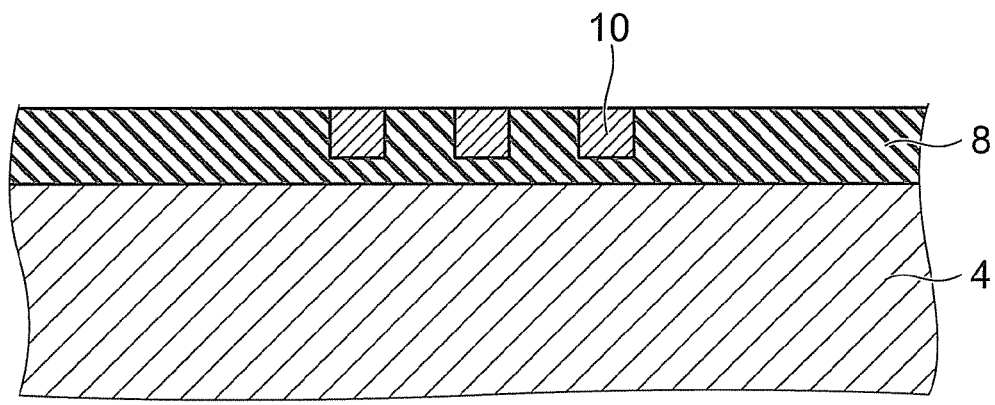
FIGS. 5 to 11 are sectional views of the infrared detection device according to the first embodiment.

As shown in FIG. 5, the protective insulating film 8 is formed on the semiconductor substrate 4. On the semiconductor substrate 4, the thermoelectric conversion layers 10 and the protective insulating film 8 are formed adjacent to each other. When an SOI substrate is used as the semiconductor substrate 4, a buried oxidation film of the SOI substrate may be used as the protective insulating film 8. Namely, the semiconductor substrate 4 can include a base, a buried insulating film provided on the base, and a semiconductor layer provided on the buried insulating film. The absorption layer 8a can contain a material used for the buried insulating film.

The thermoelectric conversion layer 10 is, for example, a p-n diode using single crystal silicon as a material. The protective insulating film 8 formed adjacent to the thermoelectric conversion layers 10 serves as a device isolation region using, for example, silicon dioxide as a material.

Figure 6:
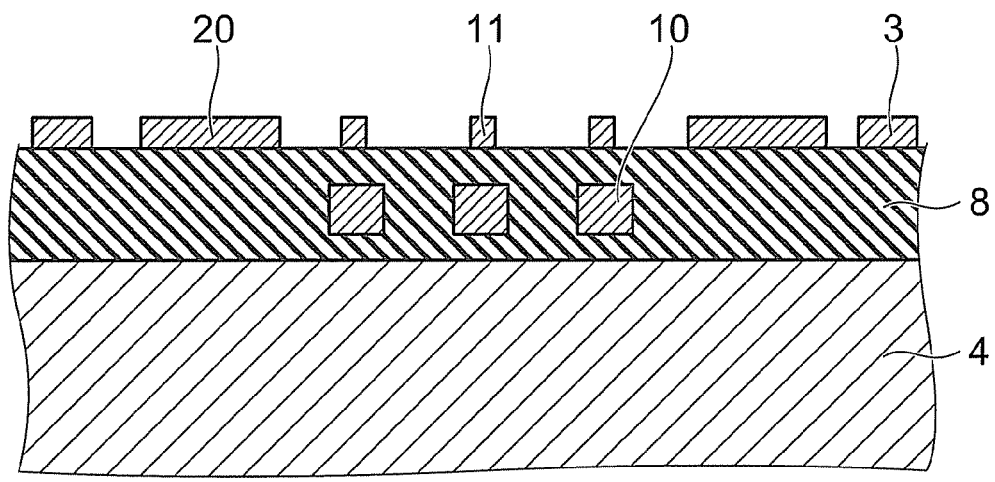

As shown in FIG. 6, a conductive material film, such as a metal film, is formed and patterned on the protective insulating film 8 formed on the semiconductor substrate 4. As a result of this, the signal interconnect sections 3, the support interconnect sections 20, and the detection cell interconnect sections 11 are formed. In FIG. 6, the signal interconnect sections 3, the support interconnect sections 20, and the detection cell interconnect sections 11 are formed on the same layer. However, these sections may be formed separately in a plurality of processes, and may have different conductive materials, thicknesses, etc. respectively.

Figure 7:
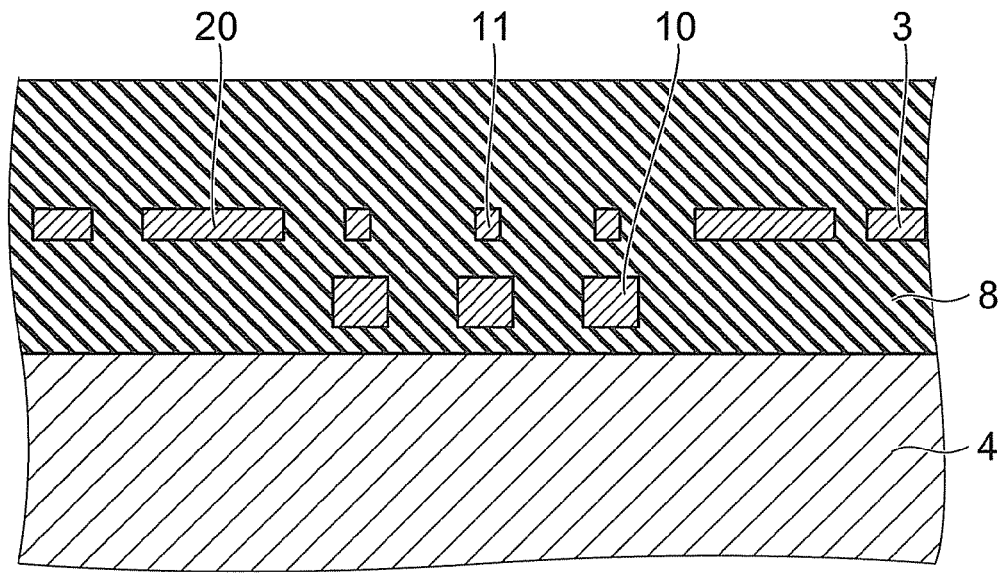

As shown in FIG. 7, the protective insulating film 8 is formed on a whole surface of the semiconductor substrate 4. Since the protective insulating film 8 also has the function as the infrared absorption section, for example, a material with a high infrared absorbance may be selected as the protective insulating film 8. Further, a multilayer structure formed of materials having different refractive indices may be used in the protective insulating film 8.

Figure 8:
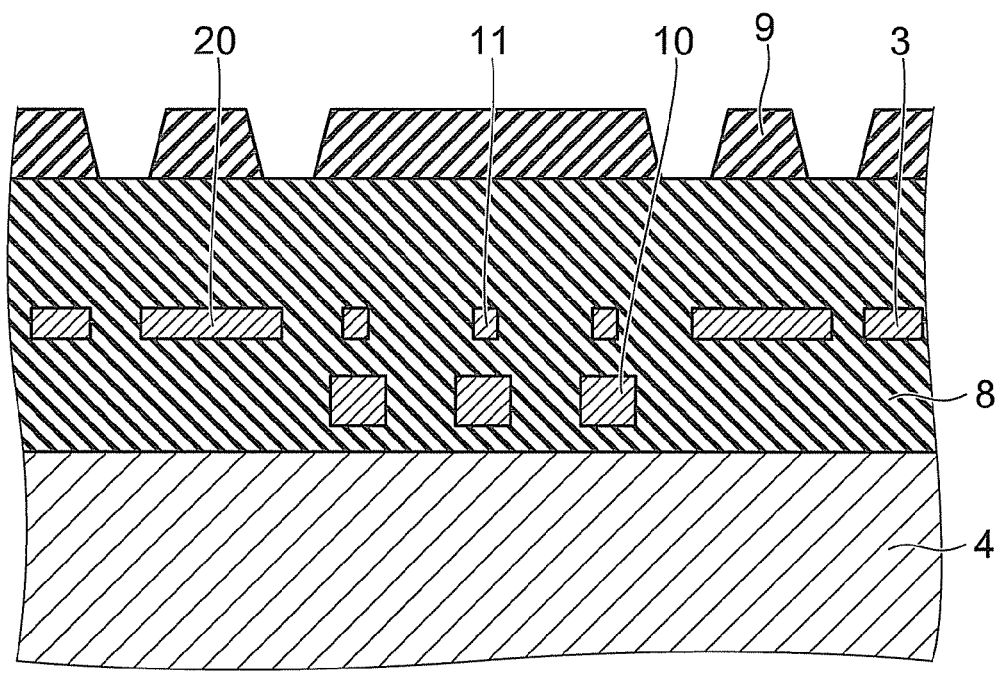

As shown in FIG. 8, a photolithography process for forming etching holes 5 is performed. Specifically, a photoresist 9 is coated on the protective insulating film 8, and a pattern is formed on the photoresist 9 by lithography using a mask.

At this time, heat treatment is performed to the patterned photoresist 9 to reflow, and thereby a sectional shape of the photoresist 9 is formed as a tapered one whose lower portion is widened as shown in FIG. 8. It is to be noted that other than reflow treatment, for example, exposure energy, an exposure time, a focal length, etc. of the photolithography are adjusted, and thereby the sectional shape of the resist whose lower portion is widened can be formed.

Figure 9:
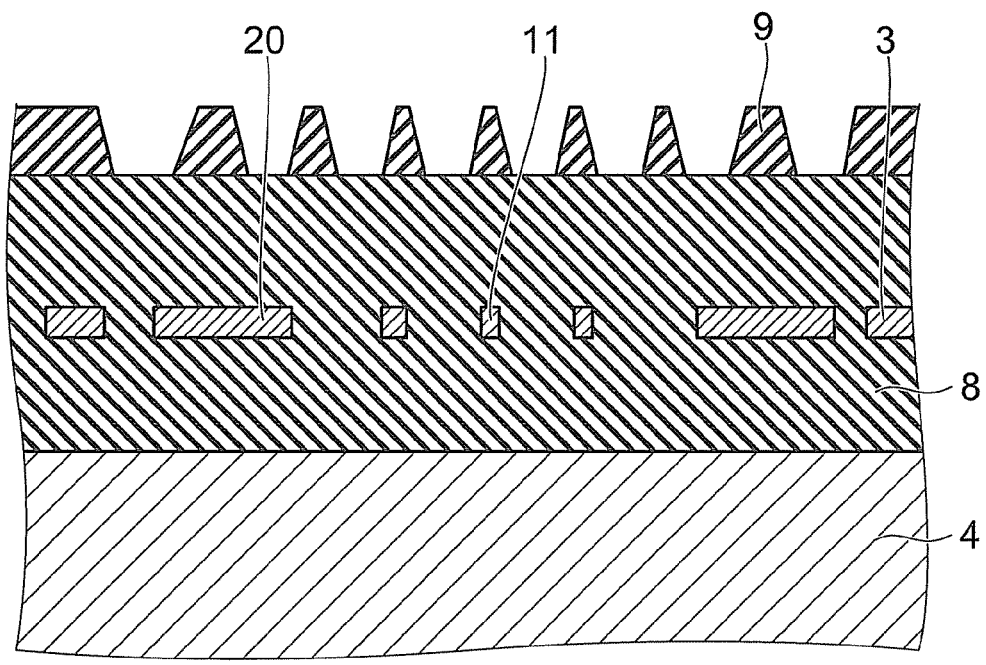

As shown in FIG. 9, a pattern of the detection cell through-holes 12 is formed on the photoresist 9 in addition to the pattern of the etching holes 5. It is to be noted that FIG. 9 is a view corresponding to a cross section taken along the line B-B' in FIG. 1 in this process. Patterning of the etching holes 5 and the detection cell through-holes 12 is performed in the same process.

A width of an upper portion of the detection cell through-hole 12 is preferably not more than 15 micrometers. The width of the upper portion of the detection cell through-hole 12 means the width of the detection cell through-hole 12 of a side to which infrared rays are irradiated in the absorption layer 8a (an opposite side of the semiconductor substrate 4). The width is, for example, a width of the detection cell through-hole 12 along an axis perpendicular to a direction from the semiconductor substrate 4 toward the absorption layer 8a. It is to be noted that when a shape of the detection cell through-hole 12 (hole) is substantially circular, the width corresponds to a diameter thereof.

When the width of the upper portion of the detection cell through-hole 12 exceeds 15 micrometers, the absorption layer 8a (protective insulating film 8) cannot easily absorb a wavelength of 8 to 14 micrometers, which is an infrared wavelength range, and the infrared rays pass through the detection cell through-hole 12, causing the reduced absorption sensitivity.

A taper angle of the detection cell through-hole 12 having the shape whose upper portion is widened is preferably not less than 45° and less than 90°. When the taper angle is less than 45°, the protective insulating film 8 is thick, and thus a process to etch by anisotropic etching, such as RIE, is difficult to be performed in the manufacturing processes. When the taper angle exceeds 90°, infrared rays are hard to be reflected inside the detection cell through-holes 12 of the protective insulating film 8, causing the reduced absorption sensitivity for the infrared rays. It is to be noted that the taper angle is an angle between a side surface of the detection cell through-hole 12 (hole) and a major surface of the semiconductor substrate 4.

A width of a lower portion of the detection cell through-hole 12 is preferably larger than a distance between the adjacent detection cell through-holes 12. The width of the lower portion of the detection cell through-hole 12 means the width of the detection cell through-hole 12 of a semiconductor substrate 4 side in the absorption layer 8a. Namely, the width of the detection cell through-hole 12 in a surface opposite to the surface to which infrared rays are irradiated is preferably larger than the distance between the adjacent detection cell through-holes 12.

When the width of the lower portion of the detection cell through-hole 12 is not more than the distance between the adjacent detection cell through-holes 12, the detection cell through-holes 12 have an larger effect than the protective insulating film 8 due to a relation of the refractive indices between the detection cell through-holes 12 and the protective insulating film 8 (absorption layer 8a), and infrared rays become hard to be absorbed by the absorption layer 8a (protective insulating film 8), causing the reduced absorption sensitivity.

Figure 10:
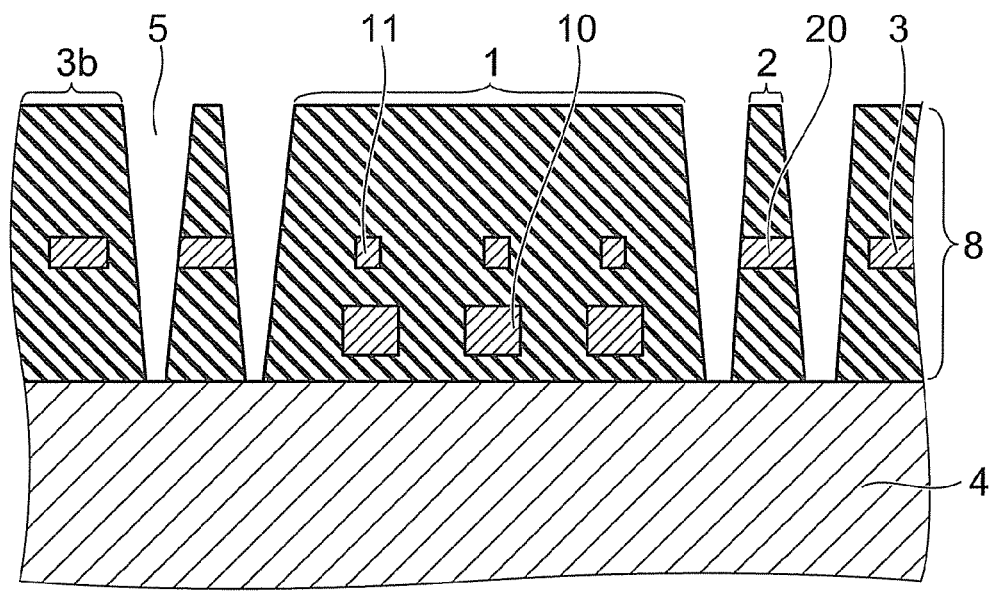

As shown in FIG. 10, the etching holes 5 are formed on a part of the semiconductor substrate 4 by, for example, anisotropic etching, such as RIE, and thereby the surface of the semiconductor substrate 4 is exposed. By the above-mentioned etching, a region in which the detection cell 1 is formed and regions in which the support sections 2 are formed are formed separately from each other.

Figure 11:
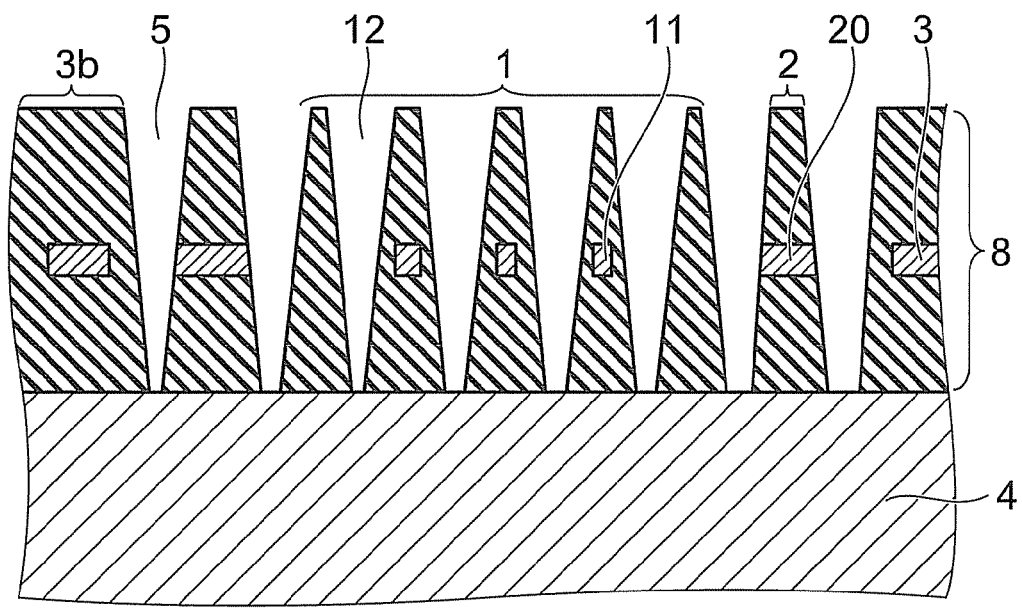

As shown in FIG. 11, similarly to FIG. 10, the detection cell through-holes 12 are formed on the part of the semiconductor substrate 4 by, for example, anisotropic etching, such as RIE, and thereby the surface of the semiconductor substrate 4 is exposed.

Figure 12:
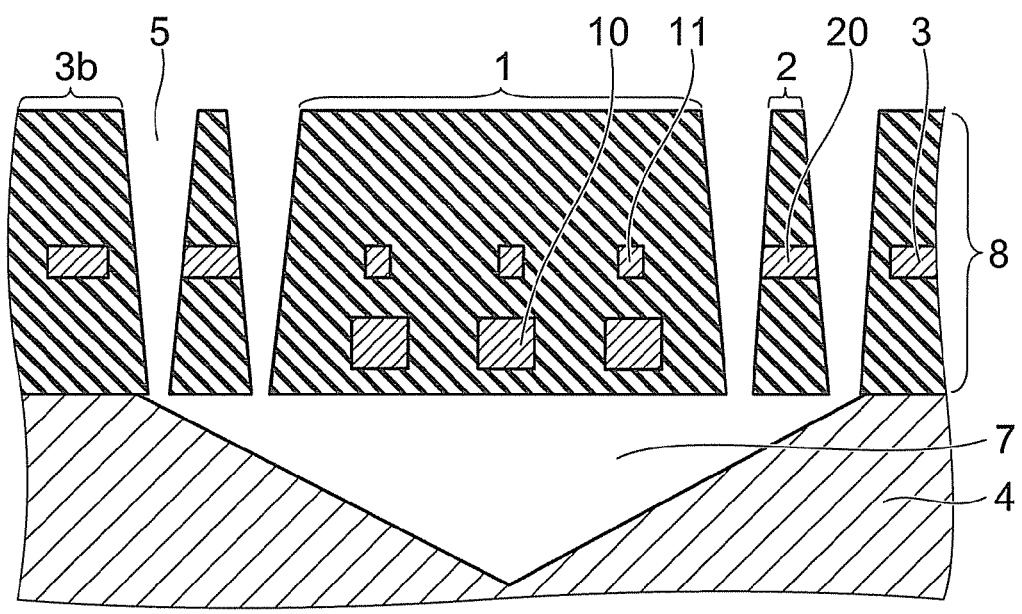
FIGS. 12 to 15 are sectional views of support sections of the infrared detection device according to the first embodiment.

As shown in FIG. 12, the semiconductor substrate 4 is gradually etched from bottom surfaces of the etching holes 5, and thereby the cavity 7 is formed. As an etchant used for this process, for example, an anisotropic etching solution, such as TMAH and KOH, are used.

Figure 13:
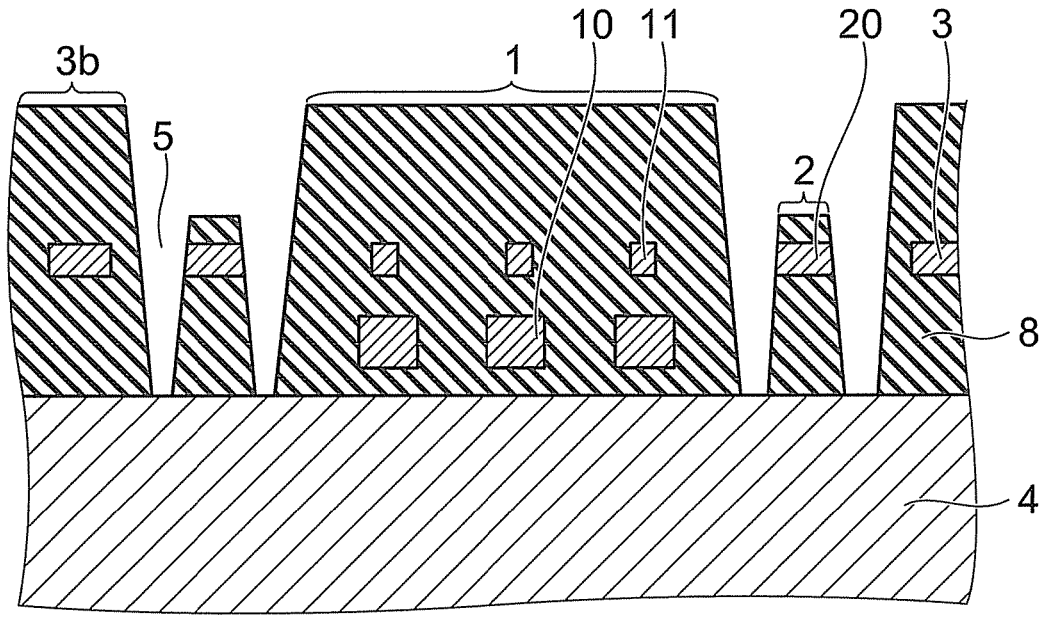

Here, as shown in FIG. 13, parts of the protective insulating film 8 of the support sections 2 are shaved in a depth direction by anisotropic etching, such as RIE, and thereby thermal conductance of the support sections 2 may be reduced.

Figure 14:
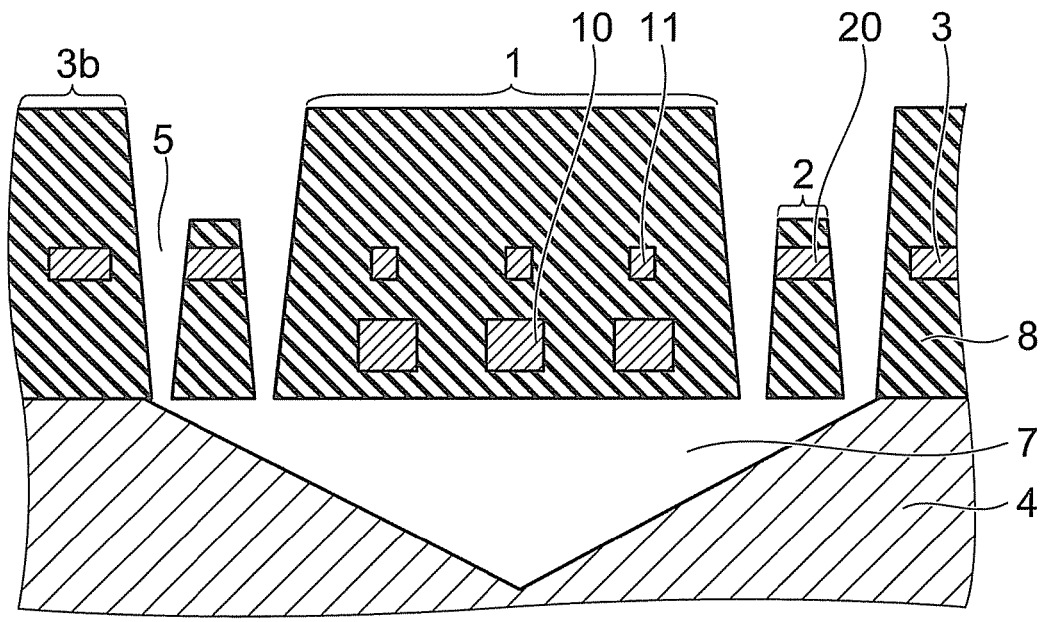

When a process shown in FIG. 13 is performed, as shown in FIG. 14, similarly to FIG. 12, the semiconductor substrate 4 is gradually etched from the bottom surfaces of the etching holes 5, and thereby the cavity 7 is formed. As an etchant used for this process, for example, the anisotropic etching solution, such as TMAH and KOH, are used.

Figure 15:
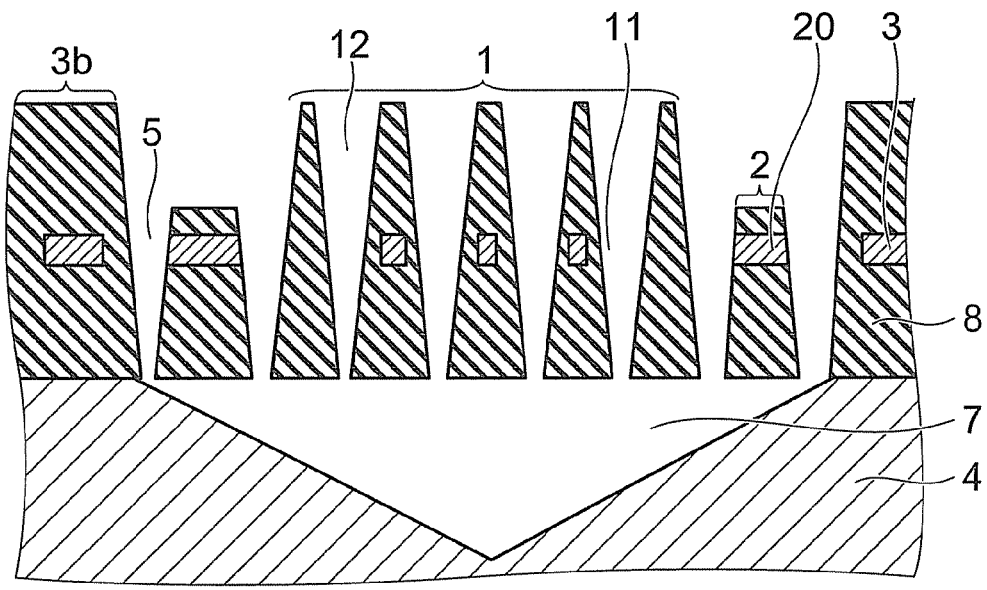

As shown in FIG. 15, similarly to FIG. 11, the detection cell through-holes 12 are formed on the part of the semiconductor substrate 4 by, for example, anisotropic etching, such as RIE, and thereby the surface of the semiconductor substrate 4 is exposed.

Here, in an uncooled type infrared detection device according to the first embodiment, an insulating material, such as silicon dioxide and silicon nitride, are used for the protective insulating film 8 that serves to absorb infrared rays. In addition to the above, a material having absorption sensitivity for the infrared rays (8 to 14 micrometers) can be used for the protective insulating film 8.

An infrared detection device was fabricated using manufacturing processes described in FIGS. 5 to 15, and evaluated were sensitivity and response characteristics that serve as characteristic indices of the infrared detection device.

Figure 16:
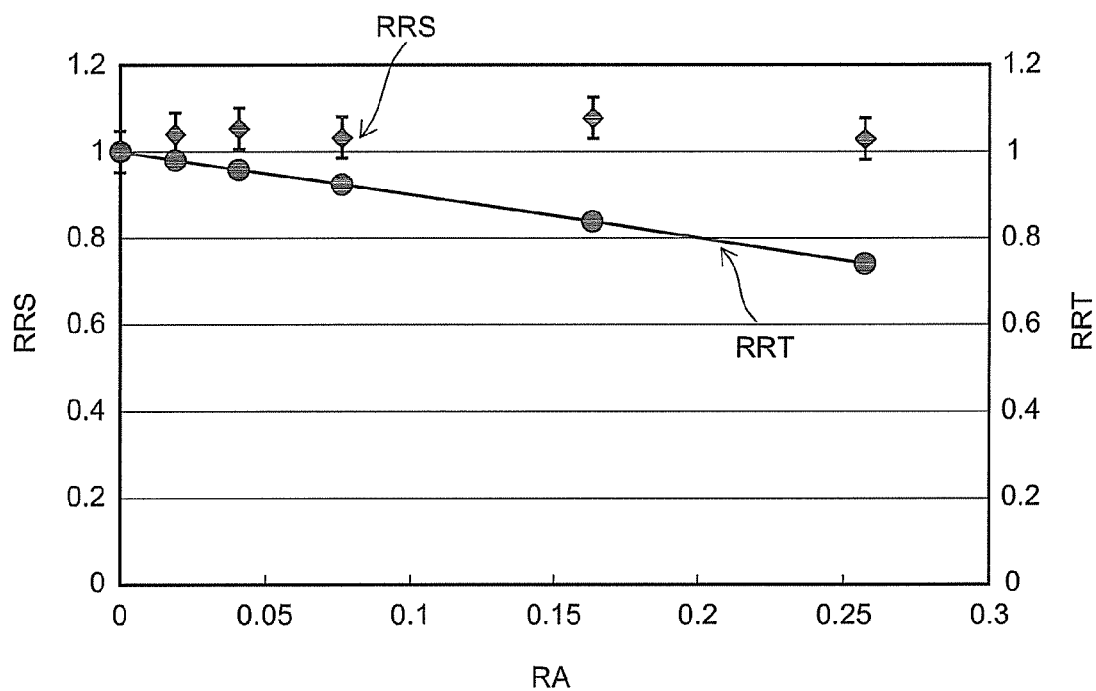
FIGS. 16 and 17 are graphs showing the characteristics of the infrared detection device according to the first embodiment.

FIG. 16 is a graph showing evaluation results. In a sample fabricated for this evaluation, the detection cell through-hole 12 is set to be a 2-micrometer square, and a taper angle thereof is 75°. In this sample, the number of the detection cell through-holes 12 is changed, and thereby a rate (occupancy) of the detection cell through-holes 12 occupying the detection cell 1 is changed. In addition, a sample having no through-holes was also fabricated as a reference example. In the reference example, the occupancy of the detection cell through-holes 12 is 0%.

A horizontal axis in FIG. 16 denotes the rate of the through-holes occupying a detection cell area (i.e., an occupancy RA=a through-hole area/an infrared absorbing layer area). In addition, rhombic symbols in FIG. 16 denote relative sensitivity ratios RRS with respect to the reference example, and circular symbols in FIG. 16 denote relative thermal time constant ratios RRT with respect to the reference example.

As shown in FIG. 16, as for the sensitivity, as shown by the rhombic symbols, even in a condition where the occupancy RA was 0.25, i.e., where the through-hole area was the largest of all the fabricated devices, sensitivity reduction was not observed. Meanwhile, as shown by the circular symbols, a thermal capacity of the detection cell is reduced by the through-holes, and thus a thermal time constant tends to decrease according to the occupancy RA.

From the graph shown in FIG. 16, it has turned out that the response characteristic is improved by 25% with respect to the infrared detection device as the reference example in which the occupancy RA is 0%. Additionally, there is no reduced sensitivity, either. It is to be noted that the infrared detection device according to the embodiment can be fabricated only by layout change of the mask with respect to the reference example.

When the response characteristic in the embodiment is set to be the same as that of a structure in the reference example, it becomes possible to reduce the thermal conductance, and to make thicker the protective insulating film 8, which is the infrared absorbing layer of the detection cell 1, in the embodiment. As for making the protective insulating film 8 thicker, since an absorption spectrum changes with a thickness, a refractive index, or laminating order of a film type, it is difficult to generally discuss the sensitivity change.

Figure 17:
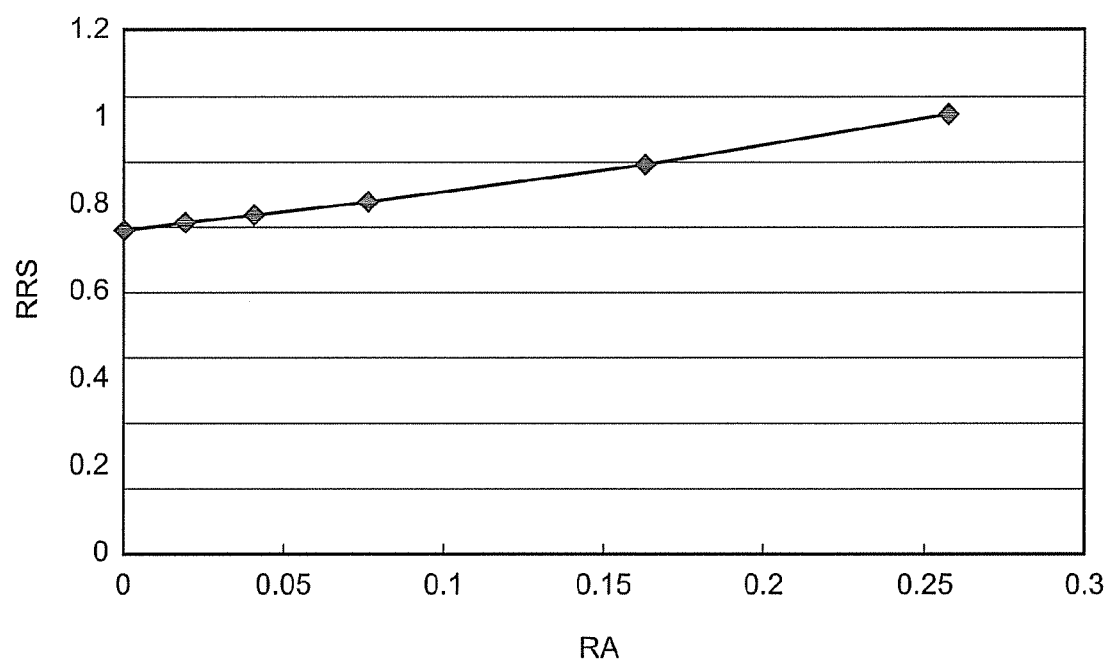

Further, based on the results, sensitivity was calculated when the thermal time constant was fixed. The results are shown in FIG. 17. A horizontal axis in FIG. 17 denotes the rate (occupancy RA) of the through-holes occupying the detection cell area. A vertical axis in FIG. 17 denotes the relative sensitivity ratio RRS. As shown in FIG. 17, when the occupancy RA becomes higher under a condition where the thermal time constant is fixed, sensitivity improves. Namely, when focusing on the change of the thermal conductance, the higher the occupancy RA is in a structure, the smaller the thermal conductance can be made. For example, when the occupancy RA is 0.25, sensitivity can be improved by 1.35 times as good as in the reference example.

As described above, in the infrared detection device according to the first embodiment, the taper-shaped detection cell through-holes 12 are provided in the infrared detection cell 1, and thereby it becomes possible to reduce the thermal capacity while the device has an absorption efficiency equal to the infrared detection device of the reference example in which no through-holes are formed.

In the infrared detection device according to the first embodiment, it becomes possible to make a response speed of a sensor higher while the device has the same sensitivity as in the reference example. Further, it becomes possible to improve the absorbance by making the infrared absorbing layer thicker, and to improve the thermal conductance by making support legs (support sections 2) slender. As a result of this, it becomes possible to improve the sensitivity while the device has the same response speed as in the reference example.

The infrared detection device according to the first embodiment can be fabricated by changing a mask pattern at the time of forming the etching holes in the reference example, thus causing no concern about increased cost and reduced yield.

In the infrared detection device according to the first embodiment, the detection cell through-holes 12 can be provided in a process of forming the cavity 7. As a result of this, etching proceeds also from the detection cell through-holes 12 as compared with, for example, the reference example in which etching of the semiconductor substrate 4 proceeds from the etching holes 5 of the periphery of the detection cell 1, thus enabling to significantly reduce an etching processing time. As a result of this, for example, poor cavity formation can be reduced, and decrease in cost can also be obtained.

Second Embodiment

A second embodiment will be described hereinafter.

Figure 18:
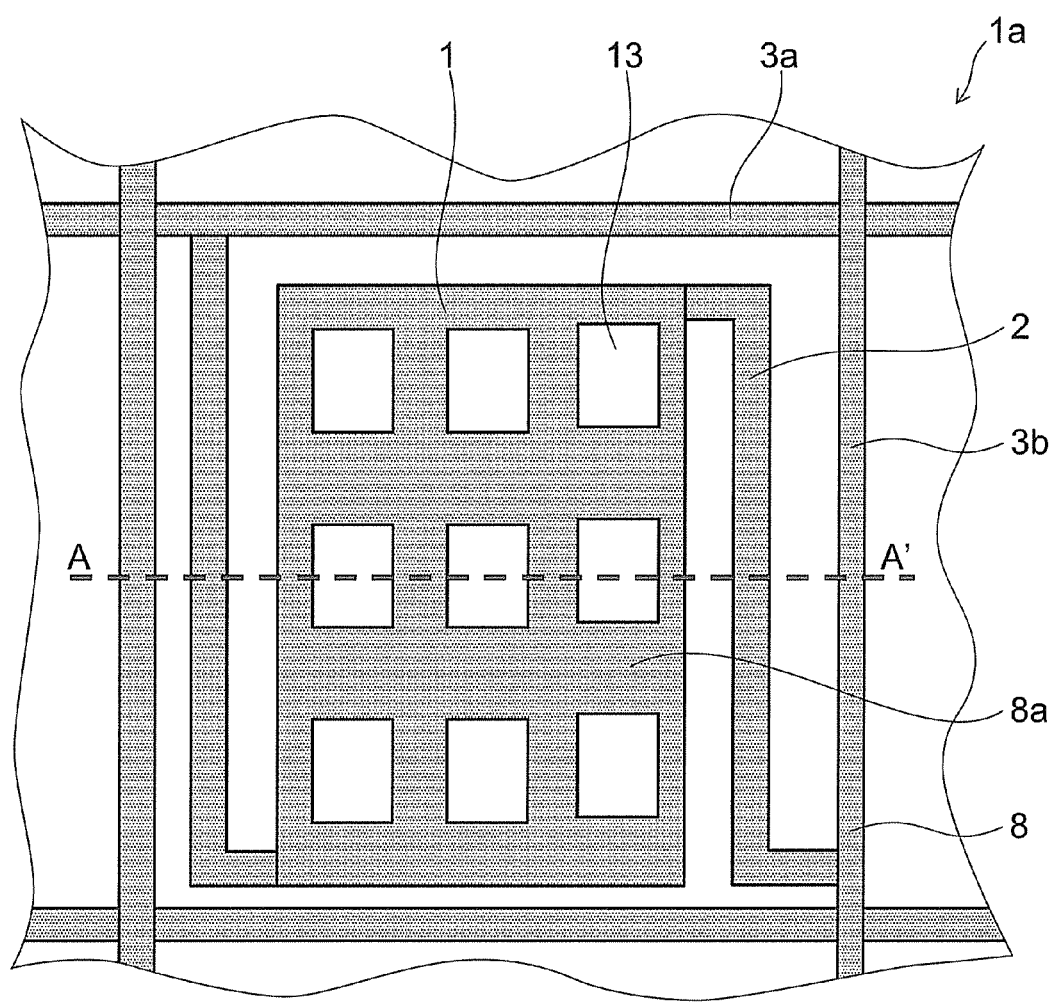
FIG. 18 is a plan view of an infrared detection device according to a second embodiment.

FIG. 18 is a plan view of an infrared detection device according to a second embodiment. In addition, FIG. 19 is a sectional view taken along a line A-A' in FIG. 18.

Using FIG. 18 and FIG. 19, will be described an example of an entire configuration of the infrared detection device according to the second embodiment.

Figure 19:
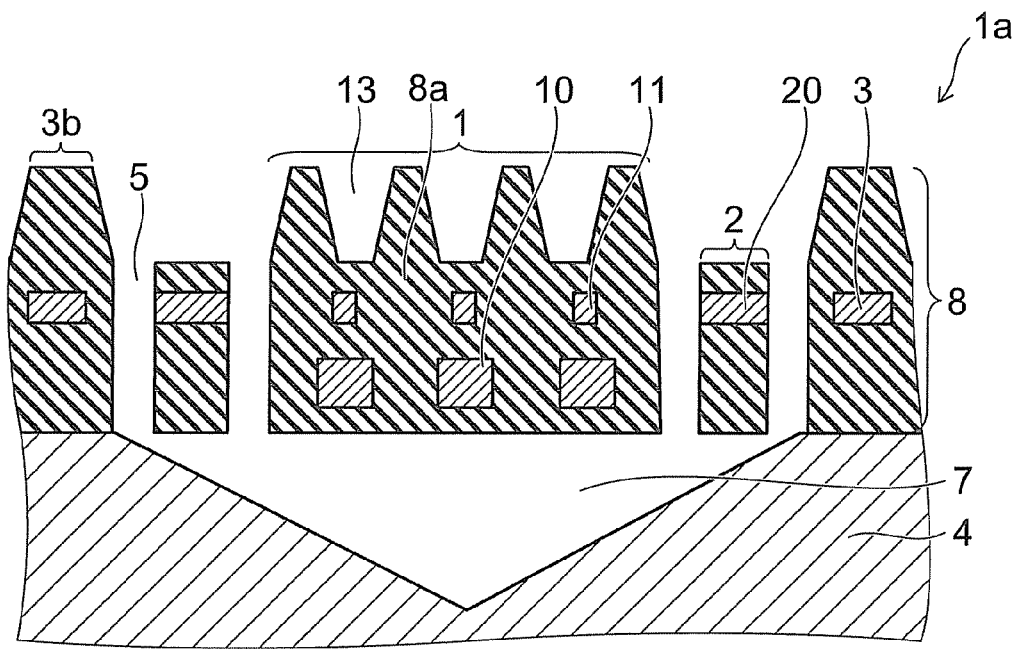
FIG. 19 is a sectional view taken along a line A-A' in FIG. 18.

As shown in FIG. 19, the cavity 7 is provided on a surface of the semiconductor substrate 4. The horizontal address lines 3a and the vertical signal lines 3b are formed in a region surrounding the cavity 7 of the semiconductor substrate 4. The horizontal address lines 3a and the vertical signal lines 3b include the signal interconnect sections 3 and a protective insulating film 8 covering around the sections, the film being based on an insulating material.

The vertical signal lines 3b are shown as the signal lines in FIG. 19, but the signal lines correspond to the horizontal address lines 3a in a cross section vertical to the line A-A'. The support sections 2 are connected to the horizontal address line 3a or the vertical signal line 3b, respectively. The support sections 2 are disposed inside the signal lines (at a cavity 7 side), and above the cavity 7 of the semiconductor substrate 4. The support section 2 includes a support interconnect section 20 and the protective insulating film 8 covering around the section, the film being based on the insulating material.

The detection cell 1 is connected to the support sections 2. The detection cell 1 is supported above the cavity 7 of the semiconductor substrate 4. The detection cell 1 includes the thermoelectric conversion layers 10, detection cell interconnect sections 11, and the absorption layer 8a. The absorption layer 8a covers around the thermoelectric conversion layers 10 and the detection cell interconnect sections 11. The protective insulating film 8 based on the insulating material is used for the absorption layer 8a. Detection cell trenches 13 (holes) are provided in the absorption layer 8a. The detection cell trenches 13 are taper-processed in the absorption layer 8a. In this example, the detection cell trenches 13 (holes) do not penetrate the absorption layer 8a.

The thermoelectric conversion layers 10 and the detection cell interconnect sections 11 are electrically conducted with each other. However, this conduction portion is omitted in FIG. 19. The absorption layer 8a of the protective insulating film 8 has a function as an infrared absorption section. The absorption layer 8a (protective insulating film 8) is, for example, formed of an insulating material, such as silicon dioxide and silicon nitride, as a single layer or a multilayer structure. The protective insulating film 8 is simply shown in FIG. 18.

The whole device is reduced-pressure-packaged (vacuum-packaged).

Namely, an atmosphere around the detection cell 1 and the support sections 2, and an atmosphere in the cavity 7 are reduced in pressure (for example, they are in a vacuum state). As described above, the detection cell 1 separated from the semiconductor substrate 4 is placed in the vacuum, and thereby thermal insulation property of the detection cell 1 is improved to increase sensitivity.

The thermoelectric conversion layer 10 has a p-n junction. Change of a voltage or a current in a forward direction is read under a condition of a fixed current or voltage by utilizing temperature dependency of a forward characteristic of the p-n junction in the thermoelectric conversion layer 10.

As shown in FIG. 19, a height of a top surface of the support section 2 when viewed from the semiconductor substrate 4 is lower than a height of a top surface of at least any of the signal interconnect section 3 and the detection cell 1 when viewed from the semiconductor substrate 4. As a result of this, a thickness of the support section 2 is thinner than that of the signal interconnect section 3 and of the detection cell 1. As a result of this, thermal conduction by the support sections 2 is suppressed, and thereby detection sensitivity improves.

Figure 20:
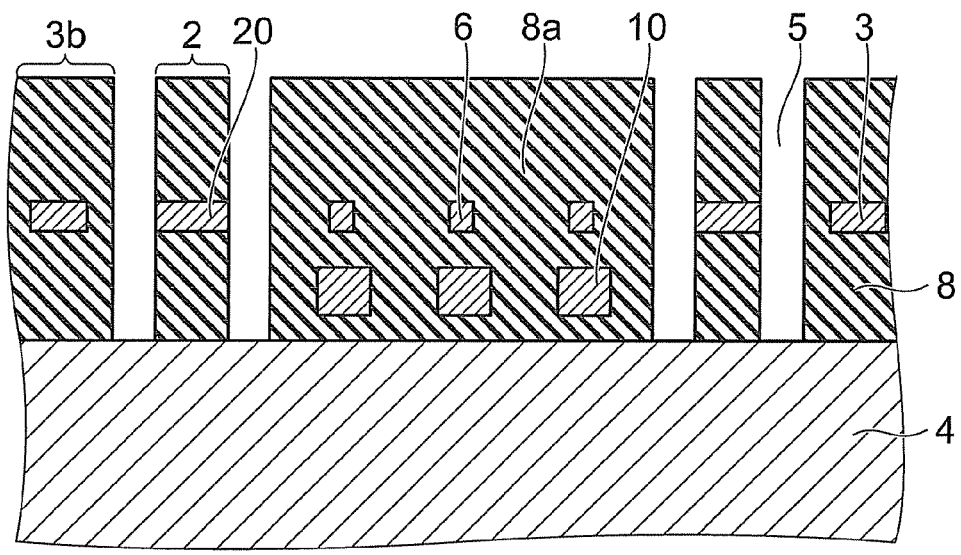
FIGS. 20 to 22 are sectional views of support sections of the infrared detection device according to the second embodiment.
Figure 21:
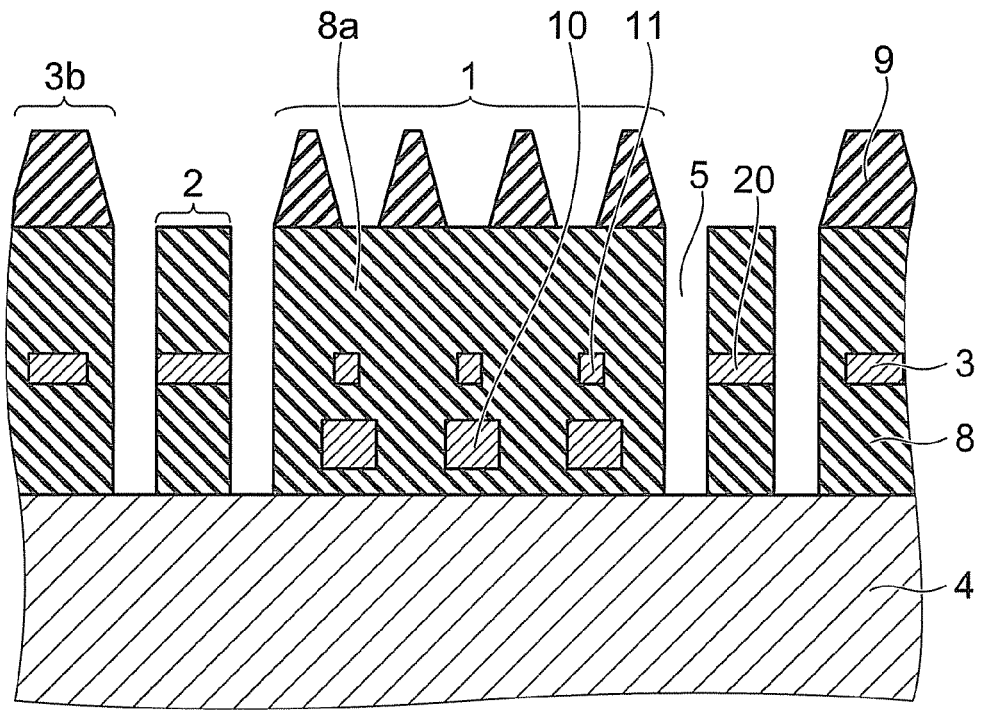
Figure 22:
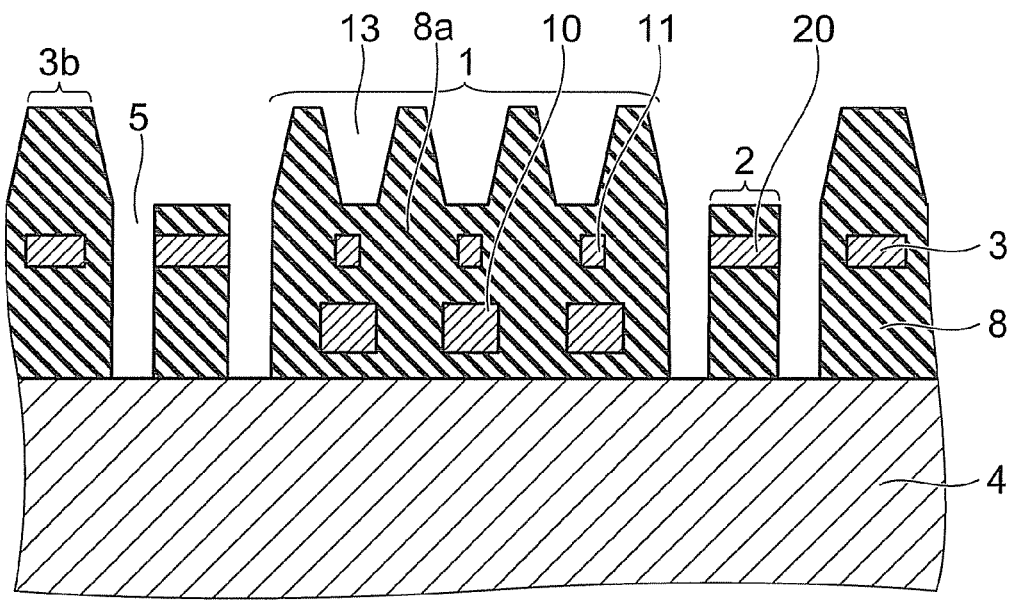

With reference to FIGS. 20 to 22, will be described a procedure example of manufacturing processes of the infrared detection device according to the second embodiment. It is noted that omitted are drawings of similar manufacturing processes to FIGS. 5 to 7, and FIG. 12 in which the manufacturing processes of the infrared detection device according to the first embodiment are shown.

Similarly to FIG. 5, the protective insulating film 8 is formed on the semiconductor substrate 4. On the semiconductor substrate 4, the thermoelectric conversion layer 10 and the protective insulating film 8 are formed adjacent to each other. When an SOI substrate is used as the semiconductor substrate 4, a buried oxidation film of the SOI substrate may be used as the protective insulating film 8. The thermoelectric conversion layer 10 is, for example, a p-n diode using single crystal silicon as a material. The protective insulating film 8 formed adjacent to the thermoelectric conversion layers 10 serves as a device isolation region using, for example, silicon dioxide as a material.

Similarly to FIG. 6, the protective insulating film 8 is formed on a whole surface of the substrate, and a conductive material film, such as a metal film, is formed and patterned on the protective insulating film 8. As a result of this, the signal interconnect sections 3, the support interconnect sections 20, and the detection cell interconnect sections 11 are formed.

Although the signal interconnect sections 3, the support interconnect sections 20, and the detection interconnect sections 11 are formed on the same layer in FIG. 20, these sections may be formed separately in the plurality of processes. Additionally, these may have different conductive materials, respectively, and may also have different thickness, respectively.

Similarly to FIG. 7, the protective insulating film 8 is formed on the semiconductor substrate 4. Since the protective insulating film 8 also has the function as the infrared absorption section, for example, a material with a high infrared absorbance may be selected for the protective insulating film 8. In addition, a multilayer structure formed of materials having different refractive indices may be used in the protective insulating film 8. The insulating material, such as silicon dioxide and silicon nitride, are used for the protective insulating film 8. In addition to the above, a material having absorption sensitivity for the infrared rays (8 to 14 micrometers) may be used for the protective insulating film 8.

As shown in FIG. 20, the etching holes 5 are formed on a part of the semiconductor substrate 4 by, for example, anisotropic etching, such as RIE, and thereby the surface of the semiconductor substrate 4 is exposed. By the above-mentioned etching, a region in which the detection cell 1 is formed and regions in which the support sections 2 are formed are formed separately from each other. A case where a sectional shape of the etching hole 5 is not tapered is depicted in FIG. 20. However, the etching hole 5 may be taper-processed as in the first embodiment.

As shown in FIG. 21, by a photolithography process, performed is patterning for shaving parts of the protective insulating film 8 of the support sections 2 in the depth direction by anisotropic etching, such as RIE. This patterning causes the thermal conductance of the support sections 2 to be reduced. At this time, the taper-shaped photoresists 9 are formed on the detection cell 1 as shown in FIG. 21.

As shown in FIG. 22, when anisotropic etching, such as RIE, is performed, the support sections 2 are shaved in the depth direction. As a result of this, the taper-shaped detection cell trenches 13 are formed on the top surface of the detection cell 1.

Similarly to FIG. 12, the semiconductor substrate 4 is gradually etched from bottom surfaces of the etching holes 5, and thereby the cavity 7 is formed. As an etchant used for this process, for example, the anisotropic etching solution, such as TMAH and KOH, are used.

Here, the detection cell through-holes 12 are provided in the infrared detection device according to the first embodiment, while the detection cell trenches 13 are provided in the infrared detection device according to the second embodiment.

In a case of the detection cell through-holes 12 of the infrared detection device according to the first embodiment, required is patterning in consideration of the thermoelectric conversion layers 10 and the detection cell interconnect sections 11 provided in the detection cell. In contrast with this, in the infrared detection device according to the second embodiment, patterning of only a region of the protective insulating film 8 is performed, and thus a layout constraint is relaxed, thereby enabling to easily fabricate an optical configuration suitable for a purpose.

In the infrared detection device according to the second embodiment, the taper-shaped trenches 13 are provided in an upper portion of the infrared detection cell 1, and thereby it becomes possible to reduce the thermal capacity while the device has an absorption efficiency equal to the infrared detection cell of the reference example in which no trenches are formed.

In the infrared detection device according to the second embodiment, it becomes possible to make a response speed of a sensor higher while the device has the same sensitivity as in the reference example. Further, it becomes possible to improve the absorbance by making the infrared absorbing layer thicker, and to improve the thermal conductance by making support legs (support sections 2) slender. As a result of this, it becomes possible to improve the sensitivity while the device has the same response speed as in the reference example.

In addition, the infrared detection device according to the second embodiment can be formed by changing a mask pattern at the time of forming the etching holes in the reference example, thus causing no concern about increased cost and reduced yield.

Third Embodiment

A third embodiment will be described hereinafter.

Figure 23:
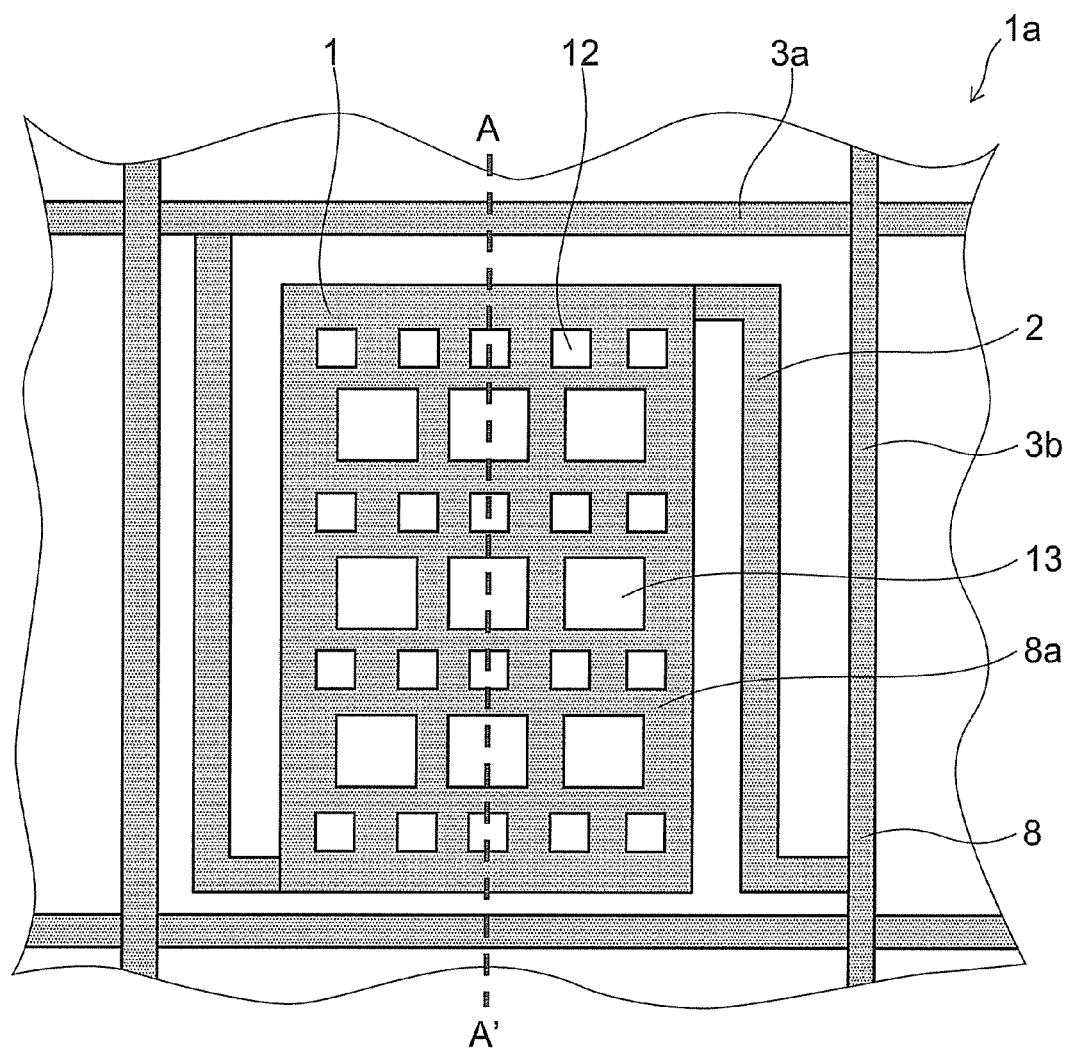
FIG. 23 is a plan view of an infrared detection device according to a third embodiment.
Figure 24:
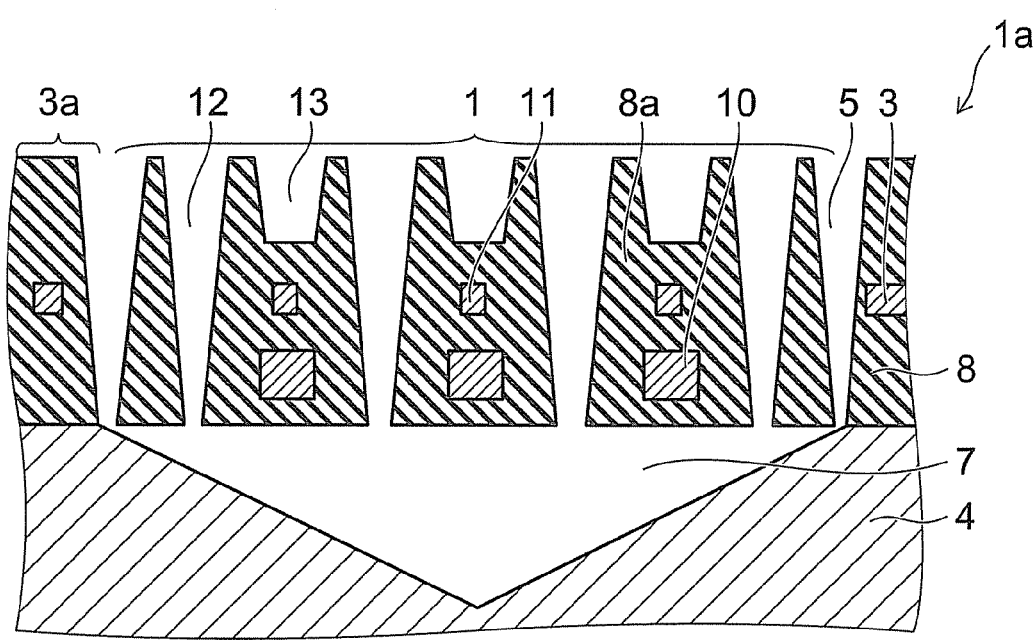
FIG. 24 is a sectional view taken along a line A-A' in FIG. 18

FIG. 23 is a plan view of an infrared detection device according to a third embodiment. FIG. 24 is a sectional view taken along a line A-A' in FIG. 23.

First, using FIGS. 23 and 24, will be described an example of an entire configuration of the infrared detection device according to the third embodiment.

As shown in FIG. 24, the cavity 7 is provided on a surface of the semiconductor substrate 4. The horizontal address lines 3a and the vertical signal lines 3b are provided in a region surrounding the cavity 7 of the semiconductor substrate 4. The horizontal address lines 3a and the vertical signal lines 3b include the signal interconnect sections 3 and the protective insulating film 8 covering around the sections, the film being based on an insulating material. The horizontal address lines 3a are shown as the signal lines in FIG. 24, but the signal lines correspond to the vertical signal lines 3b in a cross section vertical to the line A-A'.

The support section 2 is connected to the horizontal address line 3a or the vertical signal line 3b, respectively. The support section 2 is disposed inside the signal lines (at a cavity 7 side), and above the cavity 7 of the semiconductor substrate 4. The support section 2 includes a support interconnect section 20 and the protective insulating film 8 covering around the section, the film being based on the insulating material.

The detection cell 1 is connected to the support section 2. The detection cell 1 is supported above the cavity 7 of the semiconductor substrate 4. The detection cell 1 includes the thermoelectric conversion layers 10, the detection cell interconnect sections 11, and the absorption layers 8a. The absorption layer 8a covers around the thermoelectric conversion layer 10 and the detection cell interconnect section 11. The protective insulating film 8 based on the insulating material is used for the absorption layer 8a. The detection cell through-hole 12 (hole) and the detection cell trench 13 (hole) are provided in the absorption layer 8a. The detection cell through-hole 12 is taper-processed in the protective insulating film 8. For example, the detection cell trench 13 is taper-processed in the protective insulating film 8. As described above, in this example, any of the plurality of holes penetrates the absorption layer 8a, and any other thereof does not penetrate it. For example, a width of the hole penetrating the absorption layer 8a of the plurality of holes is different from a width of the hole not penetrating the absorption layer 8a of the plurality of holes. For example, a width of one of the plurality of holes is different from a width of another one of the plurality of holes.

The thermoelectric conversion layers 10 and the detection cell interconnect sections 11 are electrically conducted with each other, but the conduction portion is omitted in FIG. 24. The protective insulating film 8 doubles as a function of an infrared absorption section. The protective insulating film 8 is formed of an insulating material, such as silicon dioxide and silicon nitride, as a single layer or a multilayer structure. The protective insulating film 8 is simply shown in FIG. 24.

The whole device is reduced-pressure-packaged (vacuum-packaged). For example, an atmosphere around the detection cell 1 and the support sections 2, and an atmosphere in the cavity 7 are reduced in pressure (for example, they are in a vacuum state). The detection cell 1 separated from the semiconductor substrate 4 is placed in the vacuum, and thereby thermal insulation property of the detection cell 1 is improved to increase sensitivity.

The thermoelectric conversion layer 10 has a p-n junction. Change of a voltage or a current in a forward direction is read under a condition of a fixed current or voltage by utilizing temperature dependency of a forward characteristic of the p-n junction in the thermoelectric conversion layer 10.

Will be described a procedure example of manufacturing processes of the infrared detection device according to the third embodiment. It is noted that omitted are drawings of similar manufacturing processes to FIGS. 5 to 7, and FIG. 12 in which the manufacturing processes of the infrared detection device according to the first embodiment are shown, and to FIGS. 21 to 22 in which the manufacturing processes of the infrared detection device according to the second embodiment are shown.

As shown in FIG. 5, the protective insulating film 8 is formed on the semiconductor substrate 4. On the semiconductor substrate 4, the thermoelectric conversion layers 10 and the protective insulating film 8 are formed adjacent to each other. When an SOI substrate is used as the semiconductor substrate 4, a buried oxidation film of the SOI substrate may be used as the protective insulating film 8. The thermoelectric conversion layer 10 is, for example, a p-n diode using single crystal silicon as a material. The protective insulating film 8 formed adjacent to the thermoelectric conversion layers 10 serves as a device isolation region using, for example, silicon dioxide as a material.

As shown in FIG. 6, the protective insulating film 8 is formed on a whole surface of the substrate, and a conductive material film, such as a metal film, is formed and patterned on the protective insulating film 8. As a result of this, the signal interconnect sections 3, the support interconnect sections 20, and the detection cell interconnect sections 11 are formed.

Although the signal interconnect sections 3, the support interconnect sections 20, and the detection cell interconnect sections 11 are formed on the same layer in FIG. 6, these sections may be formed separately in the plurality of processes. Additionally, these may have different conductive materials, respectively, and may also have different thicknesses, respectively.

As shown in FIG. 7, the protective insulating film 8 is formed on the semiconductor substrate 4. Since the protective insulating film 8 also has a function as an infrared absorption section, for example, a material with a high infrared absorbance may be selected for the protective insulating film 8. In addition, a multilayer structure formed of materials having different refractive indices may be used in the protective insulating film 8. An insulating material, such as silicon dioxide and silicon nitride, are used for the protective insulating film 8. In addition to the above, a material having absorption sensitivity for infrared rays (8 to 14 micrometers) may be used for the protective insulating film 8.

As shown in FIGS. 8 and 9, a photolithography process for forming etching holes 5 is performed. At this time, heat treatment is performed to the patterned photoresist 9 to reflow, and thereby the sectional shape of the photoresist 9 is formed as a tapered one whose lower portion is widened. For example, other than reflow treatment, exposure energy, an exposure time, a focal length, etc. of the photolithography are adjusted, and thereby the sectional shape of the resist whose lower portion is widened can be formed. Patterning of the etching holes 5 and the detection cell through-holes 12 is performed in the same process.

As shown in FIGS. 10 and 11, the etching holes 5 and the detection cell through-holes 12 are formed on a part of the substrate by, for example, anisotropic etching, such as RIE, and thereby the surface of the semiconductor substrate 4 is exposed. By the above-described etching, a region in which the detection cell 1 is formed and regions in which the support sections 2 are formed are formed separately from each other.

As shown in FIGS. 21 and 22, performed is patterning for reducing the thermal conductance of the support sections 2 and for forming the detection cell trenches 13. When anisotropic etching, such as RIE, is performed, the support sections 2 are shaved in the depth direction, and the taper-shaped detection cell trenches 13 are formed on the top surface of the detection cell 1.

As shown in FIG. 12, the semiconductor substrate 4 is gradually etched from bottom surfaces of the etching holes 5, and thereby the cavity 7 is formed. As an etchant used for this process, for example, the anisotropic etching solution, such as TMAH and KOH, are used.

In the infrared detection device according to the third embodiment, both the detection cell through-holes 12 and the detection cell trenches 13 are provided. Fabricating them enables to significantly reduce the thermal capacity of the detection cell 1.

In the infrared detection device according to the third embodiment, it becomes possible to significantly reduce the thermal capacity, and to significantly reduce, for example, the thermal conductance of the support sections 2, thus enabling to improve sensitivity.

In the infrared detection device according to the third embodiment, the taper-shaped through-holes and trenches are provided inside the infrared detection cell 1, and thereby it becomes possible to reduce the thermal capacity while the device has an absorption efficiency equal to the infrared detection cell of the reference example.

In the infrared detection device according to the third embodiment, it becomes possible to make a response speed of a sensor higher while the device has the same sensitivity as in the reference example. Further, it becomes possible to improve the absorbance by making the infrared absorbing layer thicker, and to improve the thermal conductance by making support legs (support sections 2) slender. As a result of this, it becomes possible to improve the sensitivity while the device has the same response speed as in the reference example.

The infrared detection device according to the third embodiment can be fabricated by changing the mask pattern at the time of forming the etching holes in the reference example, thus causing no concern about increased cost and reduced yield.

In the infrared detection device according to the third embodiment, the detection cell through-holes 12 can be provided in the process of forming the cavity 7. As a result of this, etching proceeds also from the detection cell through-holes 12 as compared with, for example, the reference example in which etching of the semiconductor substrate proceeds from the etching holes 5 of the periphery of the detection cell 1, and thus an etching processing time can be significantly reduced. As a result of this, poor cavity formation can be reduced, and decrease in cost can also be obtained.

According to the infrared detection device according to at least one embodiment described above, the thermal capacity of the infrared detection device can be reduced without adding process processes as compared with a conventionally structured infrared detection device that does not require a complex process, such as a sacrificial layer. At this time, reduced sensitivity of the infrared detection device can be avoided by utilizing the detection cell structure according to the embodiments, thus enabling to achieve the high-speed response characteristic. In addition, it becomes possible to achieve the reduction of the thermal conductance, which has not been able to carry out due to fear of the reduction of the response characteristic, by utilizing the detection cell structure according to the embodiments, and as a result of it, and thus, improvement in sensitivity can be achieved without reducing the response characteristic.

According to the embodiments, the infrared detection device is provided in which thermal capacity can be reduced without reducing the infrared detection sensitivity, and high reliability and low cost can be achieved.

It is to be noted that an embodiment is not limited to the above-described each embodiment, but it is variously changed to be carried out. For example, although the detection cell through-holes 12 and the detection cell trenches 13 are depicted as quadrangles in the each embodiment, a shape thereof is no object, i.e., it may be a circle, a triangle, etc. as long as it can be fabricated in semiconductor processes. In addition, although the detection cell through-holes 12 and the detection cell trenches 13 are depicted in a regular arrangement in the each embodiment, the detection cell through-holes 12 and the detection cell trenches 13 may be arranged in an irregular pattern as long as all the patterns of the infrared detection devices arranged in an array form are the same.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An infrared detection device comprising a detection element, the detection element including:

a semiconductor substrate provided with a cavity on a surface of the semiconductor substrate;

a signal interconnect section provided in a region surrounding the cavity of the semiconductor substrate;

a detection cell spaced from the semiconductor substrate above the cavity, including:

a thermoelectric conversion layer; and an absorption layer laminated with the thermoelectric conversion layer, and provided with a plurality of holes penetrating the absorption layer to reach the cavity, a side surface of each of the holes being inclined to the surface of the semiconductor substrate, a first width of an upper surface portion of the absorption layer between two of the holes being wider than a second width of a lower surface portion of the absorption layer between the two of the holes, the first width and the second width being along a direction parallel to the surface of the semiconductor substrate; and a support section to hold the detection cell above the cavity and to connect the signal interconnect section and the detection cell.

2. The device according to claim 1, wherein a height of a top surface of the support section when viewed from the semiconductor substrate is lower than a height of a top surface of at least one of the signal interconnect section and the detection cell when viewed from the semiconductor substrate.

3. The device according to claim 1, wherein the first width is not more than 15 micrometers.

4. The device according to claim 1, wherein a taper angle between the side surface of the holes and the surface of the semiconductor substrate is not less than 45° and less than 90°.

5. The device according to claim 1, wherein the absorption layer is laminated over the thermoelectric conversion layer.

6. The device according to claim 1, wherein the absorption layer contains at least one of silicon dioxide and silicon nitride.

7. The device according to claim 1, wherein the thermoelectric conversion layer includes a p-n diode.

8. The device according to claim 1, wherein peripheries of the detection cell and the support section are in a reduced pressure atmosphere.

9. The device according to claim 1, wherein the semiconductor substrate includes a base, a buried insulating film provided on the base, and a semiconductor layer provided on the buried insulating film, and the absorption layer contains a material used for the buried insulating film.

10. The device according to claim 1, wherein the detection element is provided in a plurality, and the plurality of detection elements are disposed in a matrix.

11. The device according to claim 1, wherein a plane shape of the plurality of holes is a quadrangle.

12. The device according to claim 1, wherein a width of one of the plurality of holes is different from a width of another one of the plurality of holes.

13. The device according to claim 1, wherein the absorption layer absorbs infrared rays and converts the infrared rays into heat, and the thermoelectric conversion layer converts the heat converted by the absorption layer into an electrical signal.

* * * * *